United States Patent [19]

Nuding et al.

[11] 4,151,940
[45] May 1, 1979

[54] APPARATUS FOR AUTOMATICALLY LOOSENING THE MARGINAL STRIP FROM A SHEET OF CONTOUR-CUT GLASS

[75] Inventors: Werner Nuding, Aachen-Haaren; Herbert Brammertz, Aachen-Haaren; Josef Kreus, Stolberg; Walter Schwarz, Aachen, all of Fed. Rep. of Germany

[73] Assignee: Saint-Gobain Industries, Neuilly-sur-Seine, France

[21] Appl. No.: 875,109

[22] Filed: Feb. 3, 1978

[30] Foreign Application Priority Data

Feb. 8, 1977 [FR] France .................... 77 03443

[51] Int. Cl.² ............................................. C03B 33/04
[52] U.S. Cl. ....................................... 225/96.5; 225/97
[58] Field of Search ................. 225/96.5, 2, 93, 1, 225/97

[56] References Cited

U.S. PATENT DOCUMENTS

| | | | |
|---|---|---|---|
| 1,887,564 | 11/1932 | Sherts | 225/2 |
| 2,508,017 | 5/1950 | Echter et al. | 225/2 |
| 3,178,085 | 4/1965 | Jochim | 225/96.5 X |
| 3,520,456 | 7/1970 | Augustin et al. | 225/96.5 X |

*Primary Examiner*—Frank T. Yost
*Attorney, Agent, or Firm*—Pennie & Edmonds

[57] ABSTRACT

Apparatus for automatically loosening the marginal strip from a sheet of contour-cut glass with a minimum of edge defects comprises, in substance, a horizontal conveyor; a tracing assembly of cutting tools disposed above the conveyor for marking off auxiliary cutouts subdividing the marginal strip; and separation means comprising pressing tools for pressing the sheet in such a manner as to apply a bending moment along the auxiliary cutouts. The pressing tools are arranged opposite the margins both on their upper face and their lower face, and they bear on either side of the auxiliary cutout lines in order to exert bending moments along each. As a consequence, the apparatus generates a progressive breaking stress whereby separation of the margins is effected starting from an area external of the actual contour cutout line before spreading along the contour. The result is a particularly clear-cut edge.

12 Claims, 5 Drawing Figures

APPARATUS FOR AUTOMATICALLY LOOSENING THE MARGINAL STRIP FROM A SHEET OF CONTOUR-CUT GLASS

BACKGROUND OF THE INVENTION

1. Field of the Invention

This invention relates to apparatus for automatically loosening the marginal strip from a sheet of contour-cut glass.

2. History of the Art

Apparatus for loosening the marginal strip from a sheet of glass cut out along a given closed contour within a primary sheet of larger size is required in the automatic manufacture of a variety of glass products such as automobile windshields and windows.

Conventional apparatus for loosening marginal strips suffers from a number of deficiencies. Such apparatus typically employs pressing tools on either side of the closed contour so as to bend it, often producing crests and shell-shaped chips on the edges. As a consequence, in the manufacture of contour-cut windows, for example, an appreciable portion of the windows are rejected for edge defects and a larger portion require substantial machining of the edges.

SUMMARY OF THE INVENTION

In accordance with the invention, apparatus for automatically loosening the marginal strip from a sheet of contour-cut glass with a minimum of edge defects comprises, in substance, a horizontal conveyor; a tracing assembly of cutting tools disposed above the conveyor for marking off auxiliary cutouts subdividing the marginal strip; and separation means comprising pressing tools for pressing the sheet in such a manner as to apply a bending moment along the auxiliary cutouts. The pressing tools are arranged opposite the margins both on their upper face and their lower face, and they bear on either side of the auxiliary cutout lines in order to exert bending moments along each. As a consequence, the apparatus generates a progressive breaking stress whereby separation of the margins is effected starting from an area external of the actual contour cutout line before spreading along the contour. The result is a particularly clear-cut edge.

In a preferred form of the invention wherein the primary sheet is rectangular, four auxiliary cutout lines are placed near the corners, and the separation assembly, arranged downstream of the tracing station for these auxiliary lines, consists of a first assembly comprising two pairs of opposing pressing tools acting on each of the two faces, on either side of two associated auxiliary cutout lines, in order to loosen a first section of the marginal strip which is the one defined by these lines. A second assembly comprising two other pairs of pressing tools acts preferably subsequently on either face along the two remaining auxiliary lines. In this way, the edge cutting process is spread out in time for progressively increasing the rupture.

The first auxiliary cutouts are preferably transverse to the direction of motion of the conveyor, while the second ones are preferably in the direction of motion.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings.

DETAILED DESCRIPTION OF THE DRAWINGS

Figure 1:
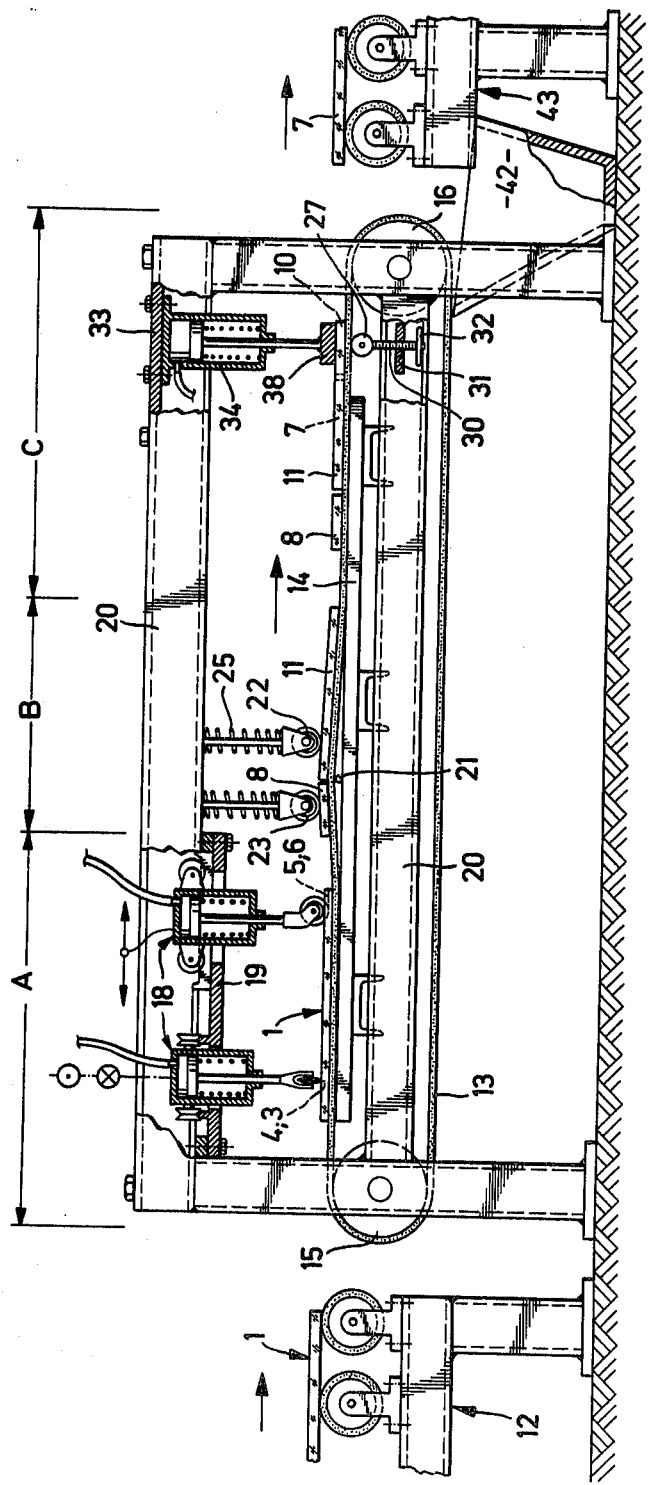
FIG. 1 is a longitudinal view of the entire device comprising three successive stations A through C.
Figure 2:
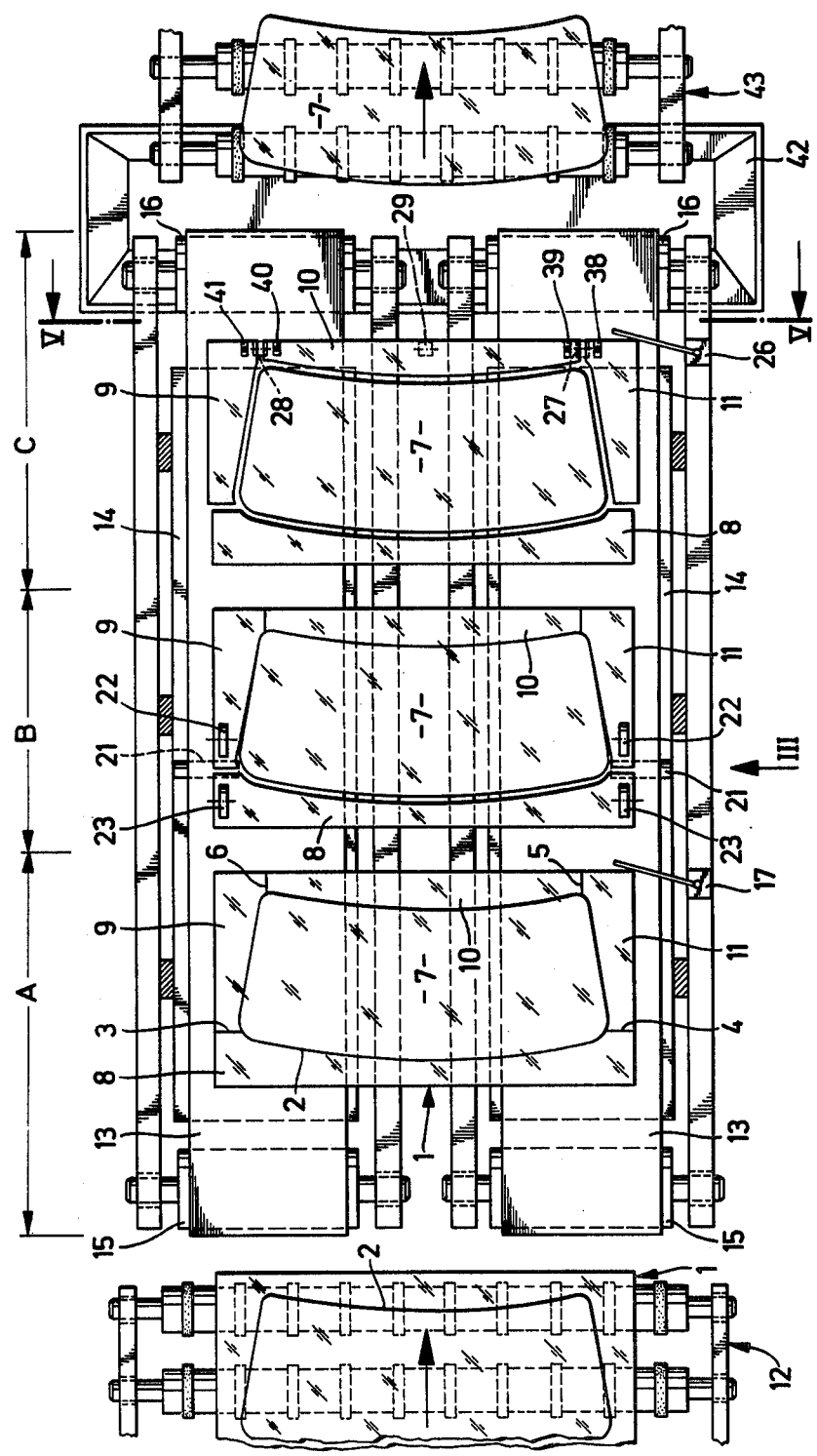
FIG. 2 is a top schematic view of the cutout lines.

As shown in FIGS. 1 and 2, the margin separation apparatus comprises essentially three work stations designated A, B, and C. At tracking station A, four auxiliary lines 3, 4, 5, and 6 are marked off on primary sheet 1, which carries a cutout contour 2. The auxiliary lines preferably cross the marginal strip near the corners of the sheet. They thus divide the sheet around the central contoured area 7, into four separate margin sections 8, 9, 10, and 11 to be subsequently eliminated. Station A is followed by station B where both cutout lines 3 and 4 are opened during the motion of the primary. The opening of the cutout lines 5 and 6 and the completion of the cutout process occur when motion has stopped at station C.

The apparatus comprises an endless conveyor 13 with two belts driven by two rollers 15 and 16 joined to a motor (not shown) so that each belt slides on a supporting plate 14. Upstream of the apparatus is a horizontal conveyor of a common type 12 which brings it primary sheet 1 originating from the cutting machine which has effected the tracing of the cutout contour 2 on the surface of the glass. As soon as primary 1, arriving at station A, acts on contact switch 17, conveyor belts 13 stop. By use of a conventional positioning device (not shown), the primary is centered so as to be located in the required position with respect to the four cutout tools 18, arranged on a frame 19, itself mounted on base 20.

After centering, the cutout tools 18 are then lowered onto the glass sheet and produce simultaneously the four auxiliary cutout lines 3, 4, 5, and 6. The cutout tools for auxiliary lines 3 and 4 run backwards between contour 2 and the lateral edges of the primary in a direction substantially perpendicular to the direction of conveyance and join contour 2 in the area in which its angles are rounded. The cutout tools of the auxiliary lines 5 and 6 are arranged and guided so that these lines extend from the two other angles of contour 2 to the forward edge of primary 1 in a direction corresponding substantially to the direction of conveyance.

Figure 3:
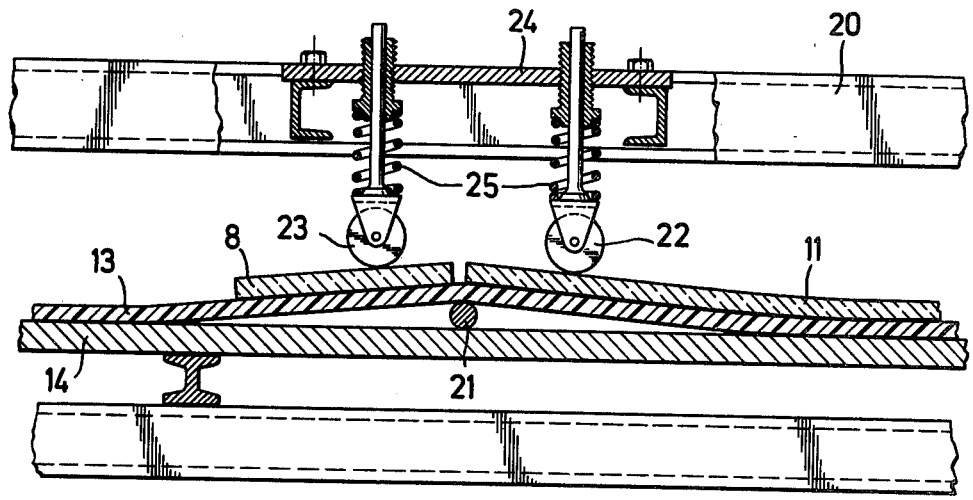
FIG. 3 is a longitudinal section in the direction of arrow III of work station B.
Figure 4:
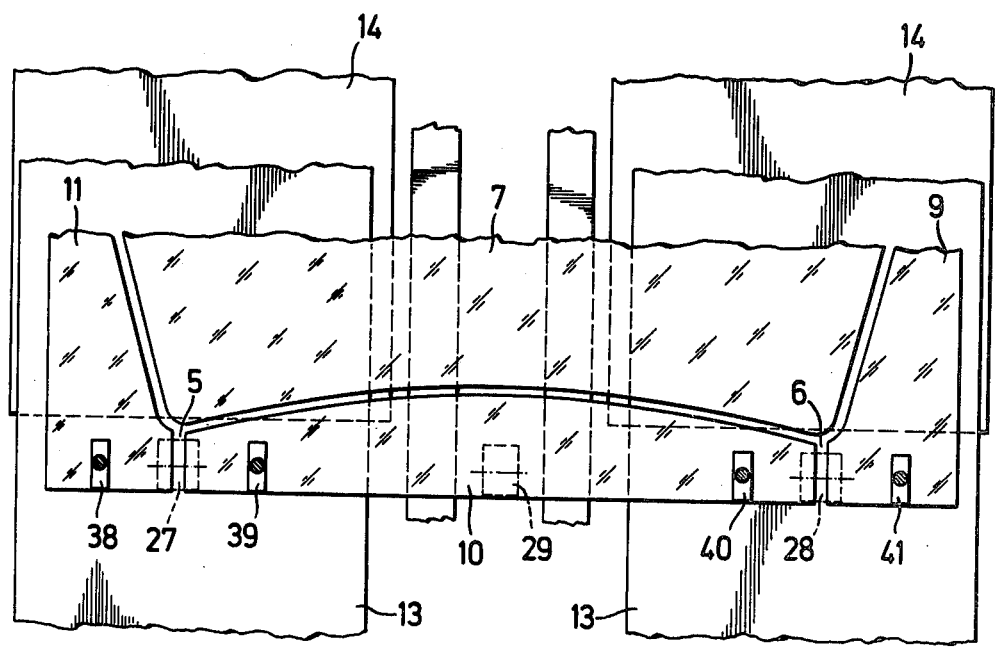
FIG. 4 is a simplified top view at station C.

The primaries, thus prepared for breaking off operations, are then conveyed by belt conveyor 13 to the first pressing station B, shown to a larger scale in FIG. 3. In this station, the only bending moments exerted on the edges of the sheet are located near the two cutout lines 3 and 4, so that these lines open up, as well as does the part of the peripheral contour located between them. Marginal section 8 thus loosens completely from the glass sheet, undergoes a certain amount of braking, and separates from the rest of the primary. The interval thus created avoids any damage to contoured area 7 due to contacts with this scrap end during the subsequent conveyance. The bending moments also open up contour 2 over a certain length in the direction of the auxiliary cutout lines 5 and 6.

The tools designed to exert the bending moment in the area of the auxiliary cutouts 3 and 4 comprise a component 21, such as a round bar, projecting from supporting plate 14 beneath each belt of conveyor 13. This component lifts the conveyor slightly where it passes thereover. In addition, two pairs of pressing rollers 22, 23 covered with a rubber tire are arranged on a frame 24 above conveyor 13 on either side of component 21. Compression springs 25 bias the pressing rollers towards the conveyor.

The pressing rollers 22, 23 thus bear on each lateral margin on either side of component 21 and induce rupture at the time of passage of the auxiliary cutouts 3 and 4. The width of the pressing rollers 22, 23 is not critical but is preferably a small part of the width of each margin, and the pressing rollers are arranged so as to pass approximately in the middle of the margin. The rear rollers exert a braking action on margin 8 and keep it away from the remainder of the primary.

After separation of margin 8, the primary continues to run toward pressing station C where it stops as soon as it acts on contact switch 26 which cuts off the power supply to the driving motor for conveyor 13. Bending stresses are then exerted on the forward edge of the primary so as to generate a bending moment along the auxiliary cutout lines 5 and 6, and thus induce the fall of the three marginal sections 9, 10, and 11.

Figure 5:
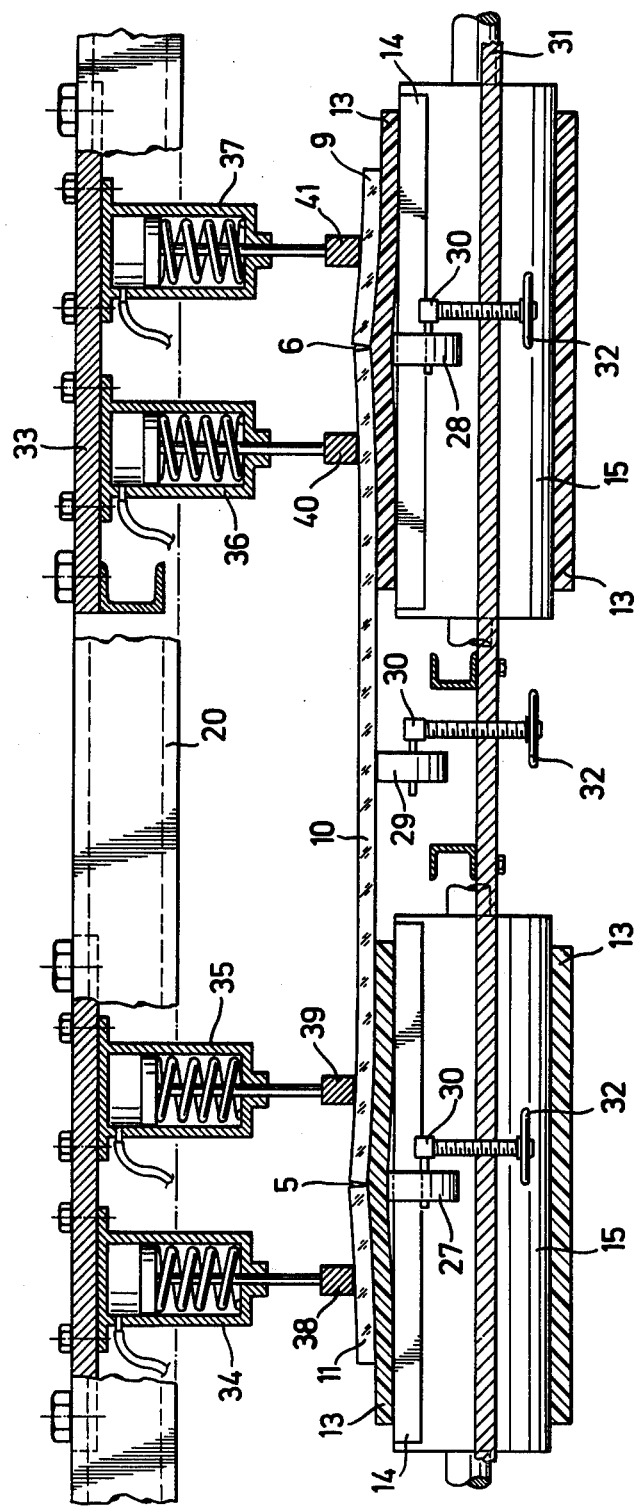
FIG. 5 is a partial sectional view at station C in the direction of arrows V—V.

The construction and mode of action of cutting station C are shown more particularly in FIG. 5. Below the belts of conveyor 13 are bearing rollers 27, 28, 29 the supports 30 of which are mounted on a cross-piece 31 of the base.

The position of these rollers can be adjusted in height using screw-jacks 32. Rollers 27 and 28 slightly lift conveyor belts 13 plumb over cutout lines 5 and 6. Roller 29 bears on the middle area of the glass sheet above which are arranged, along a frame 33, four pneumatic rams 34 to 37 the pistons of which are provided with stay-blocks 38 to 41 placed symmetrically at distances of the order of several centimeters on either side of bearing rollers 27 and 28. These stay-blocks bear on the forward edge of the primary when the rams are supplied with compressed air. Stay-blocks 38 and 39 and bearing roller 27 then serve to open cutout 5 and that part of contour 2 which extends from it, thus effecting the separation of section 11 from contoured area 7. The separation of section 9 is effected in a similar manner through the use of stay-blocks 40 and 41.

The combined pressure of stay-blocks 39 and 40 and of the opposing rollers 29 and 30 gives rise by itself to a reverse bending moment which extends the opening of cutout lines 5 and 6 towards the intervening portion of closed contour so that the pressure loosens the marginal section 10. The middle roller 29, which is somewhat raised with respect to the level of conveyor belts 13 can be used to effect additional bending. The lower rollers 40 to 42 can also be moved over a given distance by compressed air rams for each operation.

After their separation, contoured areas 7 which have been cut out, as well as scrap ends 8 to 11, are led over a bucket 42 in the direction of conveyor 43 which can be a roller conveyor similar to conveyor 12. The four scrap ends 8 to 11 fall into the space which separates the two conveyors 13 and 42 while contoured area 7 passes from one to the other. The margins are therefore eliminated as they are formed and collected in bucket 42 without damage to glass sheet 7.

Pressing rollers 22, 23 acting on the upper face as well as rams 34 and 37 and the bearing members attached thereto, i.e., bearing components 21 and bearing rollers 27 and 28, are advantageously mounted with supports that can be adjusted crosswise to the direction of motion of the conveyor. This makes it possible to adapt the cutting device to all kinds of sheet dimensions by simple modification of the position of the cutting tools. This presupposes, of course, that the positions of the cutting tools 18, placed at station A for the purpose of effecting auxiliary cutouts, are also adjustable.

While the invention has been described in connection with a preferred specific embodiment, it is to be understood that this is merely illustrative of the many other specific embodiments which can also utilize the principles of the invention. Thus numerous and varied devices can be made by those skilled in the art without departing from the spirit and scope of the present invention.

We claim:

1. Apparatus for loosening the margin from the contoured portion of a contour-cut primary glass sheet having upper and lower surfaces, comprising:
   conveyor means for conveying said glass sheet in a substantially horizontal direction;
   cutting means disposed adjacent said conveyor means for marking off auxiliary cutouts subdividing said margin into a plurality of margin portions; and
   separating means disposed adjacent said conveyor means for separating said margin portions from said contoured portion by bending, said separating means comprising means for pressing said lower and upper surfaces in opposite directions at positions on said margin outside said contoured portion and at positions on either side of said auxiliary cutout lines in order to exert a bending moment along each of said lines.

2. Apparatus according to claim 1 wherein:
   said primary glass sheet is rectangular;
   said cutting means comprises means for marking off a plurality of auxiliary cutouts substantially transverse to the direction of conveyor motion and a plurality of auxiliary cutouts substantially in the direction of conveyor motion;
   said separating means is disposed adjacent said conveyor means downstream of said cutting means and comprises one pressing station for acting on transverse auxiliary cutout lines and another pressing station for acting on auxiliary cutouts lines in the direction of conveyor motion.

3. Apparatus according to claim 1 wherein said cutting means and said separating means are disposed to act in succession on said glass sheet.

4. Apparatus according to claim 1 wherein said separating means comprises roller means for acting on the lower surface of said glass plate and a pair of side-by-side pressing members for acting on the upper surface of said glass sheet on either side of said rollers means.

5. Apparatus according to claim 2 wherein said pressing station for acting on auxiliary cutout lines in the direction of conveyor motion comprises roller means for acting on the lower surface of said glass plate and a pair of side-by-side pressing members for acting on the upper surface of said glass sheet on either side of said roller means.

6. Apparatus according to claim 5 comprising an additional bearing roller at substantially the same level as said roller means for acting as support for said contoured portion of the glass sheet.

7. Apparatus according to claim 5 wherein said pair of side-by-side pressing members for acting on the upper surface of said glass sheet are spaced apart substantially in the direction of conveyor motion.

8. Apparatus according to claim 5 wherein said pair of side-by-side pressing members for acting on the upper surface of said glass sheet are spaced apart substantially in the direction transverse to conveyor motion.

9. Apparatus according to claim 5 wherein said roller means for acting on the lower surface of said glass plate comprise bearing means for supporting said margin substantially in the region below said auxiliary cutting lines.

10. Apparatus according to claim 1 wherein said conveyor means comprises a plurality of separate conveyor belts, the combined width of which is sufficient to cover all areas wherein said means for pressing acts on said sheet.

11. Apparatus according to claim 1 wherein the position of said means for pressing is adjustable in a direction substantially transverse to the direction of conveyor motion.

12. Apparatus for loosening the margin from the contoured portion of a contour-cut primary glass sheet having upper and lower surfaces, comprising:
- conveyor means for conveying said glass sheet in a substantially horizontal direction;
- cutting means disposed adjacent said conveyor means for marking off a plurality of auxiliary cutouts substantially transverse to the direction of conveyor motion and a plurality of auxiliary cutouts substantially in the direction of conveyor motion;
- a first assembly of pressing means located downstream from said cutting means in the direction of conveyor motion for pressing the lower and upper surfaces of said sheet in opposite directions at positions on said margin outside said contoured portion and at positions on either side of the transverse auxiliary cutouts for producing bending moments along said cutouts;
- a second assembly of pressing means located downstream from said first assembly for pressing the lower and upper surfaces of said sheet in opposite directions at positions on said margin outside said contoured portion and at positions on either side of the auxiliary cutouts in the direction of conveyor motion for producing bending moments along said cutouts.

* * * * *